United States Patent
Noh

(10) Patent No.: US 7,713,901 B2
(45) Date of Patent: May 11, 2010

(54) COMPOSITION, CATALYTIC MODULE ELEMENT, AND CATALYTIC MODULE FOR SELECTIVE CATALYTIC REDUCTION OF NITROGEN OXIDES IN GASEOUS MEDIUM CONTAINING OXYGEN

(75) Inventor: Sei-Youn Noh, Incheon (KR)

(73) Assignee: Dae Young C & E Co., Ltd., Incheon (KR)

( * ) Notice: Subject to any disclaimer, the term of this patent is extended or adjusted under 35 U.S.C. 154(b) by 575 days.

(21) Appl. No.: 11/605,527

(22) Filed: Nov. 29, 2006

(65) Prior Publication Data

US 2007/0122330 A1 May 31, 2007

(30) Foreign Application Priority Data

Nov. 29, 2005 (KR) .................. 10-2005-0114710

(51) Int. Cl.
| | |
|---|---|
| B01J 31/00 | (2006.01) |
| B01J 21/00 | (2006.01) |
| B01J 8/02 | (2006.01) |
| B01J 8/00 | (2006.01) |
| B01D 53/56 | (2006.01) |
| B01D 53/94 | (2006.01) |
| B01D 53/86 | (2006.01) |
| C04B 41/50 | (2006.01) |
| C04B 41/49 | (2006.01) |
| C07F 7/18 | (2006.01) |
| C03C 25/24 | (2006.01) |
| C09D 183/04 | (2006.01) |
| C01B 21/00 | (2006.01) |
| C01B 23/00 | (2006.01) |
| C01B 25/00 | (2006.01) |
| C01B 31/00 | (2006.01) |
| C01B 33/00 | (2006.01) |
| C01B 35/00 | (2006.01) |

(52) U.S. Cl. ............... 502/158; 502/232; 502/240; 106/287.1; 106/287.13; 106/287.14; 106/287.15; 106/287.16; 423/213.2; 423/239.1

(58) Field of Classification Search .......... 502/158, 502/232, 240; 106/287.1, 287.13–287.16; 423/213.2, 239.1
See application file for complete search history.

(56) References Cited

U.S. PATENT DOCUMENTS

| | | | | |
|---|---|---|---|---|
| 3,759,867 | A | * | 9/1973 | Merrill et al. ............... 524/588 |
| 4,642,265 | A | * | 2/1987 | Suzuki ....................... 428/375 |
| 5,091,460 | A | * | 2/1992 | Seto et al. ................... 524/492 |

(Continued)

FOREIGN PATENT DOCUMENTS

KR    10-1998-0086887    12/1998

(Continued)

*Primary Examiner*—Patricia L Hailey
(74) *Attorney, Agent, or Firm*—Merchant & Gould P.C.

(57) ABSTRACT

The present invention relates to a coating composition using a catalyst for selective catalytic reduction for the removal of nitrogen oxides from the exhaust gas, a catalytic module element for selective catalytic reduction and a catalytic module for selective catalytic reduction for the removal of nitrogen oxides, and more specifically to a catalytic module element in which and a catalytic module element for selective catalytic reduction in which a plurality of plate-type or waveform glass fiber sheets on which the coating layer of a catalyst for selective catalytic reduction are formed, are repeatedly laminated and a catalytic module for casing the catalytic module element. According to the present invention, the production process is simple, economical and productive and the catalytic module element for selective catalytic reduction is excellent not only in decomposition efficiency of nitrogen oxides in the exhaust gas, but also in durability, economic efficiency and thermal shock resistance. Further, the present invention has an advantage capable of providing a catalytic module that can be used in an operation by directly placing it on the actual spot.

8 Claims, 12 Drawing Sheets

U.S. PATENT DOCUMENTS

| | | | | |
|---|---|---|---|---|
| 5,755,867 A | * | 5/1998 | Chikuni et al. | 106/287.16 |
| 6,261,357 B1 | * | 7/2001 | Egami et al. | 106/287.1 |
| 2003/0029193 A1 | * | 2/2003 | Feng et al. | 65/17.2 |

FOREIGN PATENT DOCUMENTS

| | | | |
|---|---|---|---|
| KR | 1998-0086887 | * | 12/1998 |
| KR | 10-2002-0051885 | | 6/2002 |
| KR | 2002-0051885 | * | 6/2002 |
| KR | 10-2002-0058179 | | 7/2002 |
| KR | 2002-0058179 | * | 7/2002 |
| WO | WO 2006049368 A1 | * | 5/2006 |

* cited by examiner

Gas →

Gas →

COMPOSITION, CATALYTIC MODULE ELEMENT, AND CATALYTIC MODULE FOR SELECTIVE CATALYTIC REDUCTION OF NITROGEN OXIDES IN GASEOUS MEDIUM CONTAINING OXYGEN

TECHNICAL FIELD

The present invention relates to a coating composition using a catalyst for selective catalytic reduction for the removal of nitrogen oxides, a catalytic module element for selective catalytic reduction and a catalytic module for selective catalytic reduction for the removal of nitrogen oxides, and more specifically to a catalytic module element and a catalytic module for selective catalytic reduction for the removal of nitrogen oxides, each of which has high decomposition efficiency of nitrogen oxides, is light in weight and has excellent durability, economic efficiency and thermal shock resistance.

This application claims priority from Korean Patent Application No. 10-2005-0114710 filed on Nov. 29, 2005 in the Korean Intellectual Property Office, the disclosure of which is incorporated herein by reference in its entirety.

BACKGROUND ART

Nitrogen oxides ($NO_x$), which are exhaust gases produced from a power station using, as a main fuel, coal, heavy oil and gas, is the main culprit of air pollution and much cost is required for treating the $NO_x$ gas.

When nitrogen oxides are decomposed with a catalyst for high efficiency selective catalytic reduction (SCR), which is one of catalysts for the removal of nitrogen oxides, air pollution can be efficiently reduced with a low cost.

The catalyst for selective catalytic reduction (SCR catalyst) mainly comprises a support such as titania, alumina, silica and zirconia, and oxides of active metals such as vanadium, molybdenum, nickel, tungsten, iron and copper. In particular, the commercial selective catalytic reduction techniques mostly deal with $V_2O_5/TiO_2$ catalysts. Further, various SCR catalysts for the removal of nitrogen oxides from exhaust gases are known in several patent documents including Korean Patent Nos. 382051, 473080 and 275301.

The process of selective catalytic reduction (SCR) has been used for a long time in the power station sector to remove the nitrogen oxides from exhaust gases. Herein, ammonia ($NH_3$) is introduced into exhaust gases and is selectively reacted with the nitrogen oxides on a suitable catalyst to obtain nitrogen and water.

In the past, a method for manufacturing the most generally known catalytic module element in connection with selective catalytic reduction (SCR) techniques includes wash coating and extrusion.

The wash coating is a technique that is used in manufacturing a catalytic converter used as an automobile exhaust emission control system and in which a catalyst is thinly coated on the surface of a cordierite in the form of honeycomb (grid-type square brick form). However, this process is difficult to mass-produce a catalyst since the whole operation is manually performed in the selective catalytic reduction for many stationary sources and is not economical in that expensive cordierite is used as the support and hence the competitive price is lower than a process directly extruding an inexpensive catalyst.

Meanwhile, the extrusion generally uses a honeycomb produced through an extrusion manner by converting SCR powders into a highly viscous liquid phase. However, the honeycomb produced through the extrusion manner has problems in that is heavy and there are cracks in a molded article during drying and baking of the molded and extruded product, it is not economic because longer times are required in baking, and physical strength is lowered. In other words, cracks are generated because an exothermic reaction occurs in a drying step of a catalyst and thus an organic binder is suddenly volatilized. Further, the extrusion has problems in that the removal efficiency of nitrogen oxides is low and various types of catalytic module elements cannot be manufactured.

DISCLOSURE

Technical Problem

The present invention has been made to solve the aforementioned problem. It is therefore an object of the present invention to provide a catalytic coating composition for selective catalytic reduction, which is light in weight, excellent durability and economic efficiency, and is capable of highly efficiently removing nitrogen oxides.

It is another object of the present invention to provide a catalytic module element for selective catalytic reduction and a method for producing the catalytic module element, which is light in weight, excellent durability and economic efficiency, and is capable of highly efficiently removing nitrogen oxides.

It is still another object of the present invention to provide a catalytic module for selective catalytic reduction, which is light in weight, excellent durability and economic efficiency, and is capable of highly efficiently removing nitrogen oxides.

Technical Solution

In order to achieve the aforementioned object of the present invention, the present invention provides a catalytic coating composition for selective catalytic reduction for the removal of nitrogen oxides, containing a silicone-based polymer; silicone-based ceramic powders or glass fiber powders; and catalyst powders for selective catalytic reduction (SCR).

Further, in order to achieve the aforementioned another object of the present invention, the present invention provides a catalytic module element for selective catalytic reduction for the removal of nitrogen oxides in which a coating layer is formed by coating a catalytic coating composition for selective catalytic reduction for the removal of nitrogen oxides onto a porous plate-type or bent-type glass fiber support.

In order to achieve the aforementioned another object of the present invention, the present invention provides a method for producing the catalytic module element, comprising the steps of: impregnating a porous plate-type glass fiber support in the catalytic coating composition for selective catalytic reduction to form a coating layer and air-drying the coating layer; fabricating a sheet on which the coating layer is formed into a plate-type or waveform sheet; and baking the plate-type or waveform sheet.

In order to achieve the aforementioned still another object of the present invention, the present invention provides a catalytic module for selective catalytic reduction, comprising a hollow cubic case provided with opened upper and lower sides; a plurality of catalytic module elements for selective catalytic reduction arranged in the internal space of the case; a cap for sealing the upper and lower sides of the case.

Hereinafter, the present invention is described in detail.

A catalyst for selective catalytic reduction for the removal of nitrogen oxides (hereinafter referred to as an "SCR catalyst") according to the present invention contains a silicone-based polymer, silicone-based ceramic powders or glass fiber powders and catalyst powders for SCR.

The silicone-based polymer is excellent in heat resistance and abrasion resistance, preferably a nano-silica based oxide prepared by hydrolytic condensation of alkoxysilane represented by the following formula (1) and water-dispersible silica.

$$(R^1)_n Si(OR^2)_m \tag{1}$$

wherein $R^1$ and $R^2$ may be the same or different from each other and are independently selected from an alkyl group having 1 to 6 carbon atoms and an aryl group having 6 to 20 carbon atoms;

n is an integer of 1 or 2; and m is an integer of 2 or 3.

Preferable specific examples of alkoxysilane represented by the formula (1) include methyltrimethoxysilane, methyltriethoxysilane, dimethyldiethoxysilane and diphenyldimethoxysilane.

Preferable specific examples of the formula (1) include $(R^1)Si(OR^2)_3$.

wherein $R^1$ is an alkyl group having 1 to 3 carbon atoms or an aryl group having 6 to 13 carbon atoms; $R^2$ is an alkyl group having 1 to 3 carbon atoms.

The water-dispersible silica used has preferably pH of 3 to 11, a particle size of 15 to 40 μm and a solid content of 20 to 80% by weight.

When the water-dispersible silica is neutral or alkaline, the reaction may be delayed to proceed gelation. In this case, a pH-modified curing catalyst is used to acidify the neutral or alkaline water-dispersible silica. As the pH-modified curing catalyst for acidification, hydrochloric acid, sulfuric acid, nitric acid and dicyandiamide are preferably used.

In the formula (1), when R is a methyl group, the silicone-based polymer can be prepared in accordance with the following reaction scheme 1 and a partial condensate of alkoxysilane is the same as the following reaction scheme 1.

[Reaction Scheme 1]

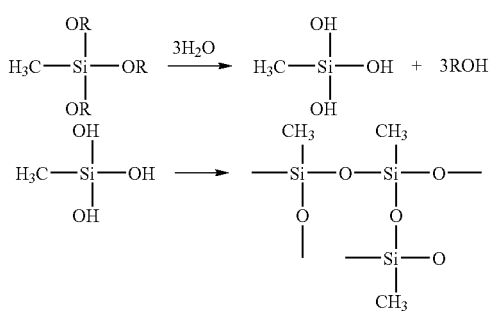

The silicone-based polymer prepared above is preferably contained in the range of 10 to 70 parts by weight, more preferably 20 to 60 parts by weight based on the total coating composition.

When the content thereof is less than 10 parts by weight, the adhesion of the SCR catalyst to the glass fiber support is lowered because the particle size of the formed particles is small. When the content thereof exceeds 70 parts by weight, the formed particles cover the SCR catalyst and thus the specific surface area of the SCR catalyst is decreased, which leads to lower decomposition capability of nitrogen oxides.

The silicone ($SiO_2$)-based ceramic powders or glass fiber powders are mixed in the coating composition in order to improve properties such as the hardness and abrasion resistance of the SCR catalyst coated onto the glass fiber support.

The silicone-based ceramic powders refer to metal oxide powders containing $SiO_x$ and the glass fiber powders refer to ones prepared by finely dividing a glass fiber.

The particle size of the silicone-based ceramic powders or glass fiber powders used is preferably in the range of 0.1 to 3 mm. When the particle size is less than 0.1 mm, the specific surface area of the catalyst is decreased to deteriorate the efficacy of the SCR catalyst. When the particle size is more than 3 mm, specific surface area and hardness are increased and thus the catalyst efficiency is increased, but cracks are easily generated by external impacts because the surface becomes coarse and the hardness becomes high.

The amount used of the silicone-based ceramic powders or glass fiber powders is preferably contained in the range of 1 to 20 parts by weight, more preferably 1 to 15 parts by weight based on the total coating composition. It is not preferred that the hardness of the coating layer is suddenly lowered when the content thereof is less than 1 part by weight, while the reaction efficiency of the SCR catalyst is suddenly deteriorated when the content thereof exceeds 20 parts by weight.

The catalyst powders for SCR include ones usually used in the art of the present invention without limitations. However, the amount used thereof is preferably contained in the range of 30 to 80 parts by weight based on the total coating composition. There is a problem in that the hardness of the coating film is low and the catalyst powders are easily fallen from the coating film when the content thereof is less than 30 parts by weight, while the hardness of the coating film is too high and cracks are generated even by slight impact and the nitrogen oxidation efficiency is decreased when the content thereof exceeds 80 parts by weight.

A method for preparing a catalytic coating composition for selective catalytic reduction is described below.

The method for preparing a catalytic coating composition for selective catalytic reduction includes the steps of: (A) dissolving a silicone-based polymer in an organic solvent; (B) adding silicone-based ceramic powders or glass fiber powders to the resulting solution to mix each other; and (C) adding catalyst powders for SCR to the resulting mixed solution to mix and stir.

First, in the (A) step, the silicone-based polymer is dissolved in the organic solvent.

The organic solvent is used for improving storage stability of the silicone-based polymer and the dispersion effect of the SCR catalyst and one or more polyhydric alcohols selected from methanol, ethanol, propanol, isopropanol, ethylene glycol, diethylene glycol and propylene glycol can be preferably used.

The organic solvent is preferably contained in the range of 10 to 50 parts by weight based on the total coating composition of the present invention. When the content thereof is less than 10 parts by weight, there is a problem in durability in that cracks are generated during coating of the coating composition onto a glass fiber support due to the viscosity increase during mixing with the SCR catalyst and the catalyst is easily fallen off because of weak adhesion. When the content thereof exceeds 50 parts by weight, the decomposition efficiency of nitrogen oxides is lowered because the viscosity is decreased and the content of the SCR catalyst is decreased.

In the (B) step, an appropriate amount of silicone-based ceramic powders or glass fiber powders is added to the solution of the step (A) to mix each other.

Then, in the step (C), the conventional catalyst powders for SCR are added to the mixed solution and the resulting solution is mixed and stirred to prepare a coating composition of the present invention.

The present invention provides a catalytic module element for selective catalytic reduction for the removal of nitrogen oxides.

The catalytic module element for selective catalytic reduction for the removal of nitrogen oxides according to the present invention is one in which a coating layer is formed by coating the coating composition onto a porous plate-type glass fiber support or glass fiber support bent in a predetermined shape.

One preferable structure of the support is one in which a first sheet and a second sheet are orthogonalized and repeatedly laminated with each other, each of which has a cross-sectional surface bent in a plurality of sinusoidal waveforms.

Another preferable structure of the support is one in which a first porous planar sheet and a second sheet having a cross-sectional surface bent in a plurality of sinusoidal waveforms are sequentially and repeatedly laminated.

Still another preferable structure of the support is one in which a first porous planar sheet and a second sheet having a cross-sectional surface alternately having truncated ridges and bent in a plurality of substantially sinusoidal waveforms are sequentially and repeatedly laminated.

Still more another preferable structure of the support is one in which a first porous planar sheet and a second sheet having a cross-sectional surface bent in a plurality of chopping waveforms are sequentially and repeatedly laminated.

In this case, the support having the above-mentioned shapes is preferably a sheet-shaped support having a length of 300 mm to 1,800 mm, a width of 100 mm to 1,000 mm and a thickness of 0.2 mm to 1 mm so that the support can be arranged in the inside of a given case.

A method for producing the catalytic module element for selective catalytic reduction according to the present invention is described below.

The method for producing the catalytic module element for selective catalytic reduction according to the present invention comprises the steps of:

(a) impregnating a porous plate-type glass fiber support in the catalytic coating composition for selective catalytic reduction to form a coating layer and air-drying the coating layer;

(b) fabricating a sheet on which the coating layer is formed into a plate-type or waveform sheet; and (c) baking the plate-type or waveform sheet.

The step (a) may further include impregnating the porous plate-type glass fiber support in a silicone-based polymer solution to coat the support with the silicone-based polymer solution and air-drying the coating layer before the porous plate-type glass fiber support is impregnated in the catalytic coating composition for selective catalytic reduction.

In the step (b), the plate-type sheet on which the coating layer is formed is not changed in shape after the (a) step. The waveform sheet can be fabricated using a hot roller. Further, the waveform sheet may be one in which the coating layers are formed on various waveform sheets having the above-mentioned bent structures. In this case, the waveform sheets having various bent structures can be fabricated by pressurization by means of molds having various shapes.

In the step (c), it is preferable to bake at 100 to 500° C. When the baking temperature is less than 100° C., the processing time becomes long. When the baking temperature exceeds 500° C., the coating layer may be broken or damaged. In this case, the sheet is baked by shortening the baking time to 10 to 50 minutes, thereby contributing to improvements in nitrogen oxide removal efficiency properties and productivity of the element.

The chemical reaction occurred in a catalyst coating layer of the catalytic module element prepared above is typically represented by the following reaction scheme 2:

[Reaction scheme 2]

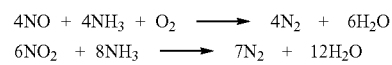

$$4NO + 4NH_3 + O_2 \longrightarrow 4N_2 + 6H_2O$$
$$6NO_2 + 8NH_3 \longrightarrow 7N_2 + 12H_2O$$

Referring to the reaction scheme 2, a selective catalytic reduction consists of a principle in which nitrogen monoxide and nitrogen dioxide are converted into nitrogen and water vapor, which are harmless to men, using ammonia as a reducing agent and a catalyst. In particular, optimum operating conditions are achieved when the reaction molar ratio of ammonia and nitrogen monoxide is 1.0.

The present invention further includes a catalytic module for selective catalytic reduction.

The catalytic module for selective catalytic reduction according to the present invention comprises a hollow cubic case provided with opened upper and lower sides; a plurality of catalytic module elements for selective catalytic reduction arranged in the internal space of the case; a cap for sealing the upper and lower sides of the case.

Materials for the case are preferably steel, stainless steel or glass fiber preferably having a thickness of 0.2 mm to 1 mm, a width of 150 mm to 1000 mm, a length of 150 mm to 1000 mm and a height of 150 mm to 1800 mm.

ADVANTAGEOUS EFFECTS

The catalytic module element for selective catalytic reduction for the removal of nitrogen oxides having the above-mentioned structure according to the present invention are not only excellent in density, adhesion, abrasion resistance, durability and thermal shock resistance of glass fiber and the SCR coating layer, but also is extremely excellent in nitrogen oxide removal efficiency. Contrary to honeycomb, which has only one form in the past, various forms of catalytic module elements can be fabricated. Further, according to the present invention, the SCR catalytic module element can be greatly improved in specific surface area and is light because its weight can be reduced, and the fabrication time can be shortened because of simple fabrication process. Further, since many SCR catalytic module elements can be produced even using a small amount of the catalyst, the present invention can provide more economical and useful effects than the conventional honeycomb in terms of price and production competition.

DESCRIPTION OF DRAWINGS

The present invention will be more clearly understood from the following detailed description taken in conjunction with the accompanying drawings, in which.

REFERENCE NUMERALS

Figure 1:
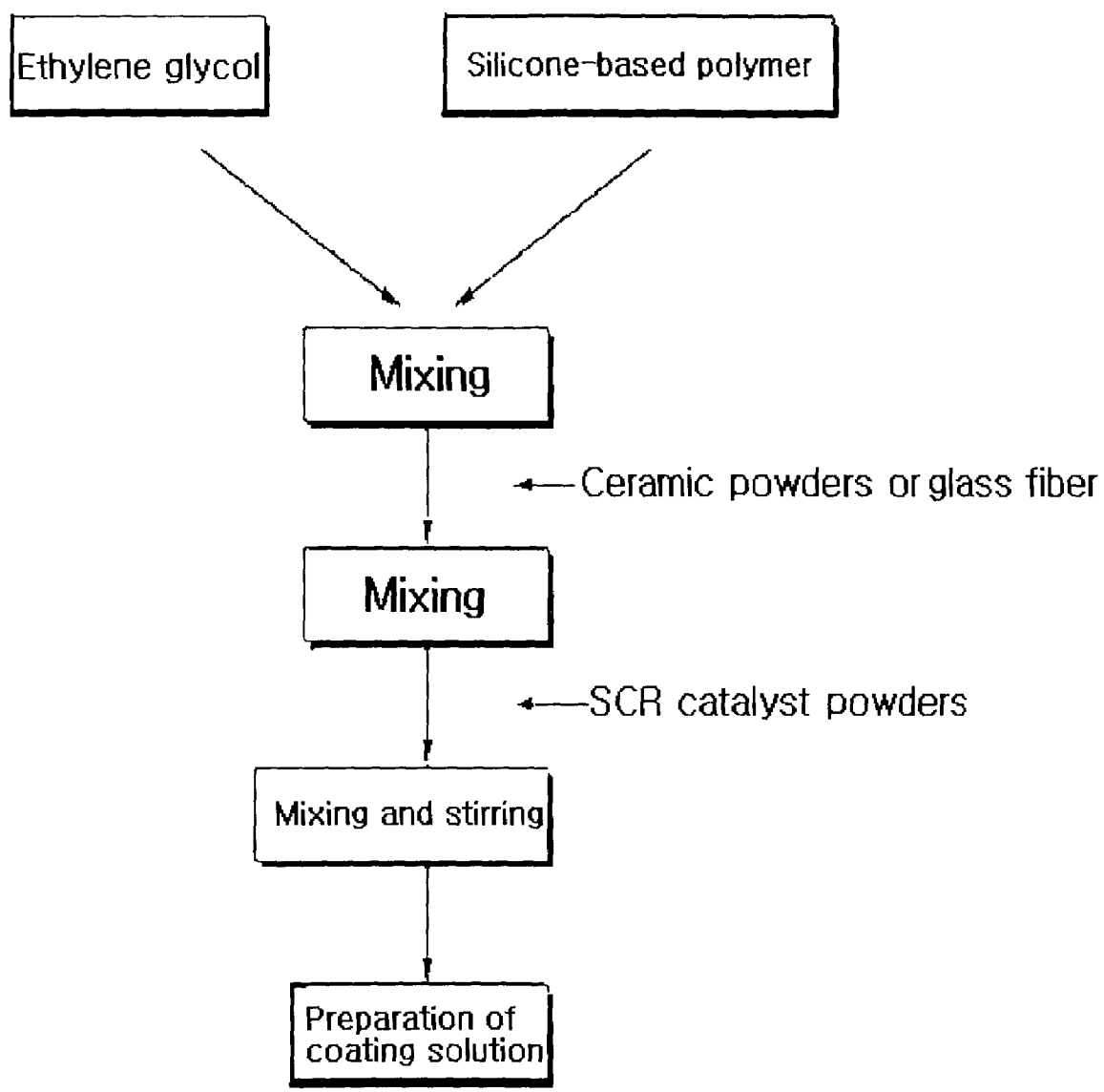
FIG. 1 is a production process flow chart for a catalytic coating composition for selective catalytic reduction (SCR) according to an embodiment of the present invention.

1: height of waveform of catalytic module element
2: thickness of waveform of catalytic module element
3: pitch of waveform of catalytic module element
4: plate-type sheet of catalytic module element
5: waveform of catalytic module element
6, 7, 8: size of catalytic module cassette
9: cap of catalytic module cassette
10: catalytic module cassette
11: support for cap of catalytic module cassette
12: hole of catalytic module element
13: SCR catalyst fixing binder
14: SCR catalyst particle

BEST MODE

FIG. 1 is a production process flowchart for a catalytic coating composition for selective catalytic reduction according to an embodiment of the present invention. As shown in FIG. 1, the production process represents a process for producing a coating composition according to the present invention through the steps of: (A) dissolving a silicone-based polymer in ethylene glycol as an organic solvent; (B) adding silicone-based ceramic powders or glass fiber powders to the solution obtained in the (A) to mix each other; and (C) adding catalyst powders for SCR to the mixed solution obtained in the (B) to mix and stir.

Figure 2:
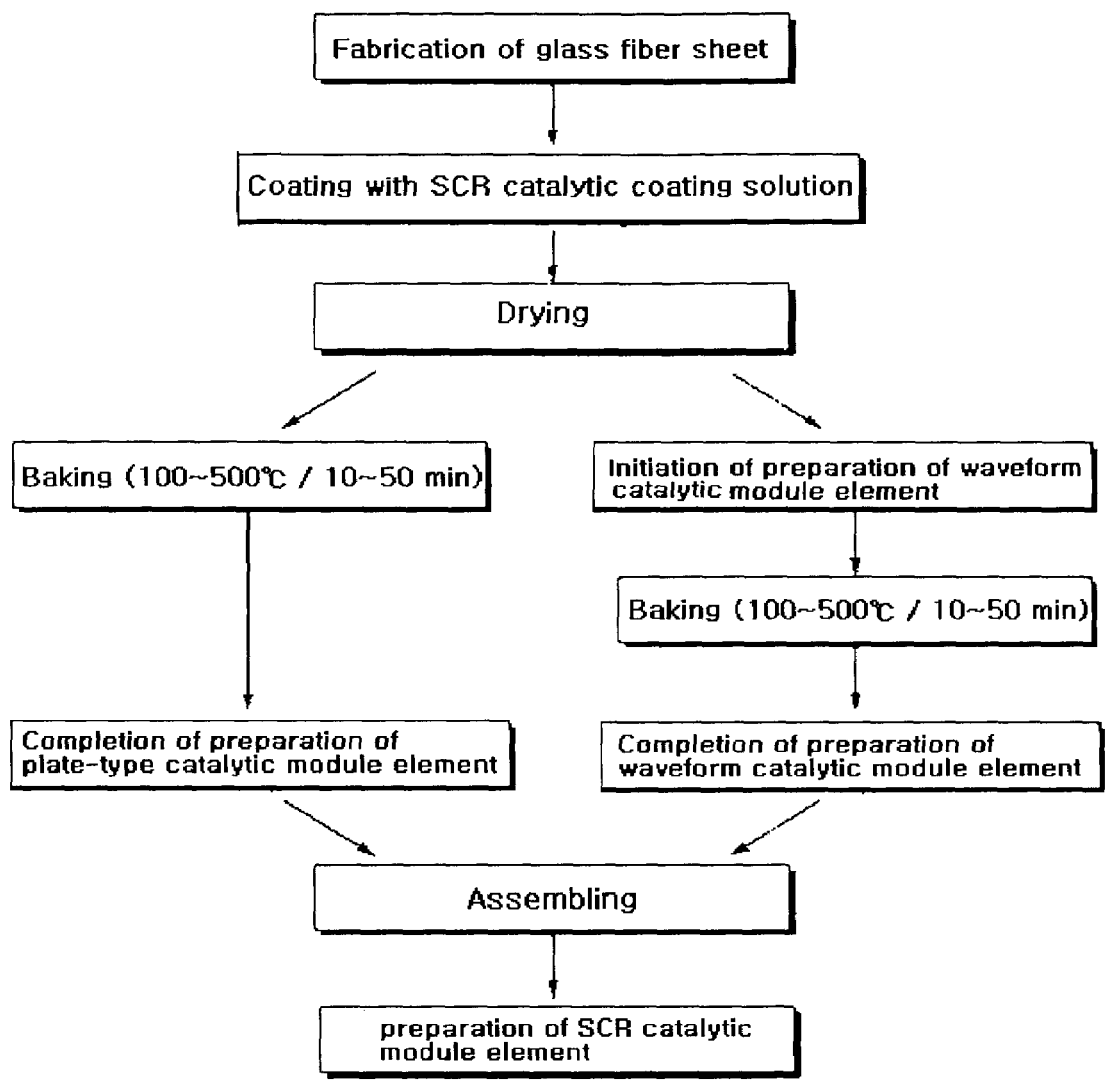
FIGS. 2 and 3 are each a production process flow chart for a plate-type or waveform catalytic module element in which an SCR catalyst coating layer is formed.
Figure 3:
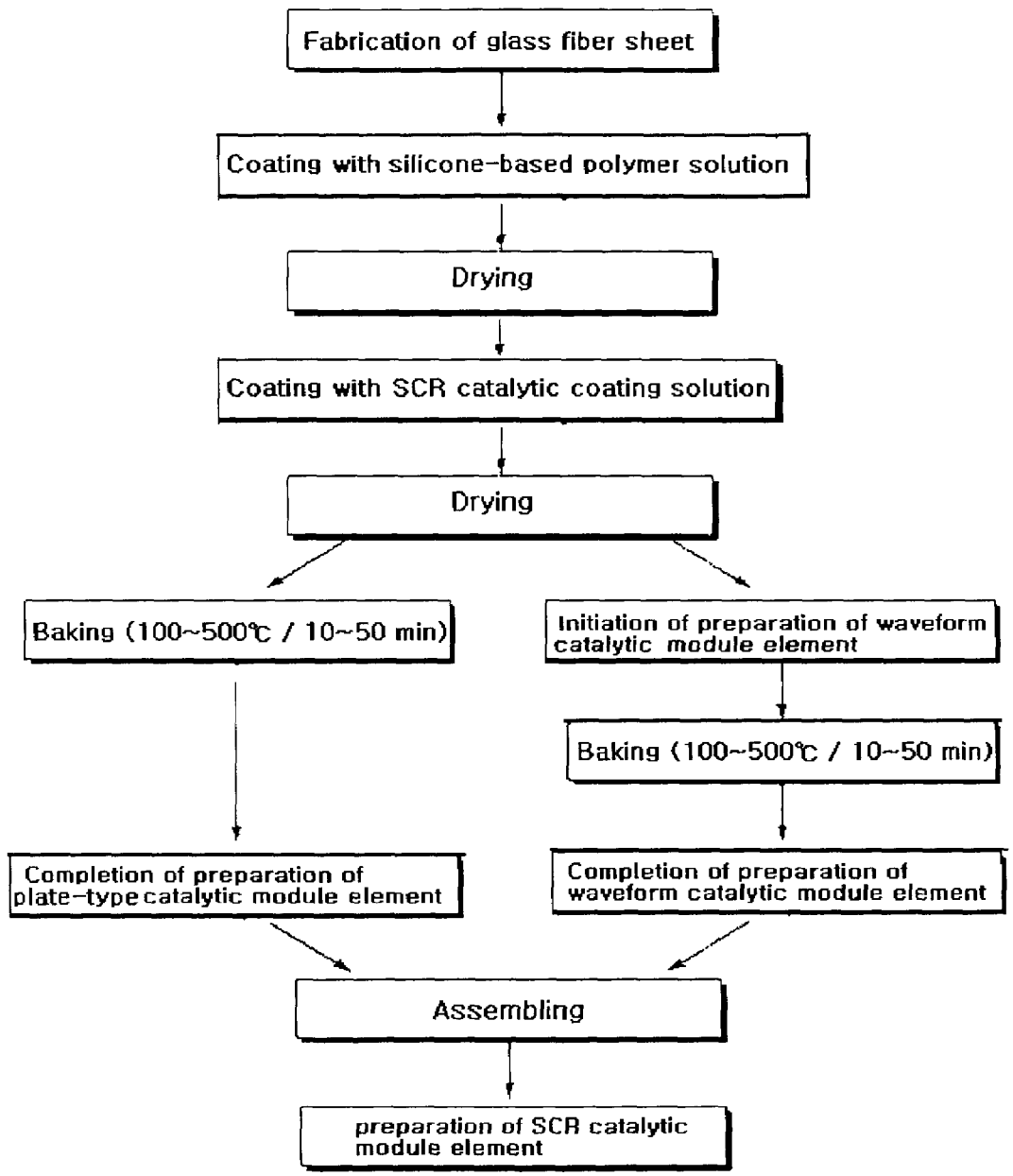

Flow charts of FIGS. 2 and 3 shows a production process for a plate-type or waveform catalytic module element in which a coating layer of a catalyst for selective catalytic reduction according to an embodiment of the present invention is formed.

Referring to FIG. 2, an example of the production process comprises the steps of: impregnating a porous plate-type glass fiber sheet as a porous plate-type glass fiber support in the catalytic coating composition for selective catalytic reduction to form a coating layer and air-drying the coating layer; pressurizing by means of a mold the plate-type sheet on which the SCR coating layer is formed, to fabricate into a waveform sheet, if necessary; and baking the waveform sheet on which the coating layer is formed, at 100 to 500° C. for 10 to 20 minutes to produce a catalytic module element.

Referring to FIG. 3, another example of the production process comprises the steps of: impregnating a porous plate-type glass fiber sheet as a porous plate-type glass fiber support in a silicone-based polymer solution to coat the sheet with the silicone-based polymer solution and air-drying the coating layer; impregnating the plate-type sheet on which the silicone-based polymer is coated, in the catalytic coating composition for selective catalytic reduction (SCR) to form a coating layer and air-drying the coating layer; pressurizing by means of a mold the plate-type sheet on which the SCR coating layer is formed, to fabricate into a waveform sheet, if necessary; and baking the waveform sheet on which the coating layer is formed, at 100 to 500° C. for 10 to 20 minutes to produce the catalytic module element.

Figure 4:
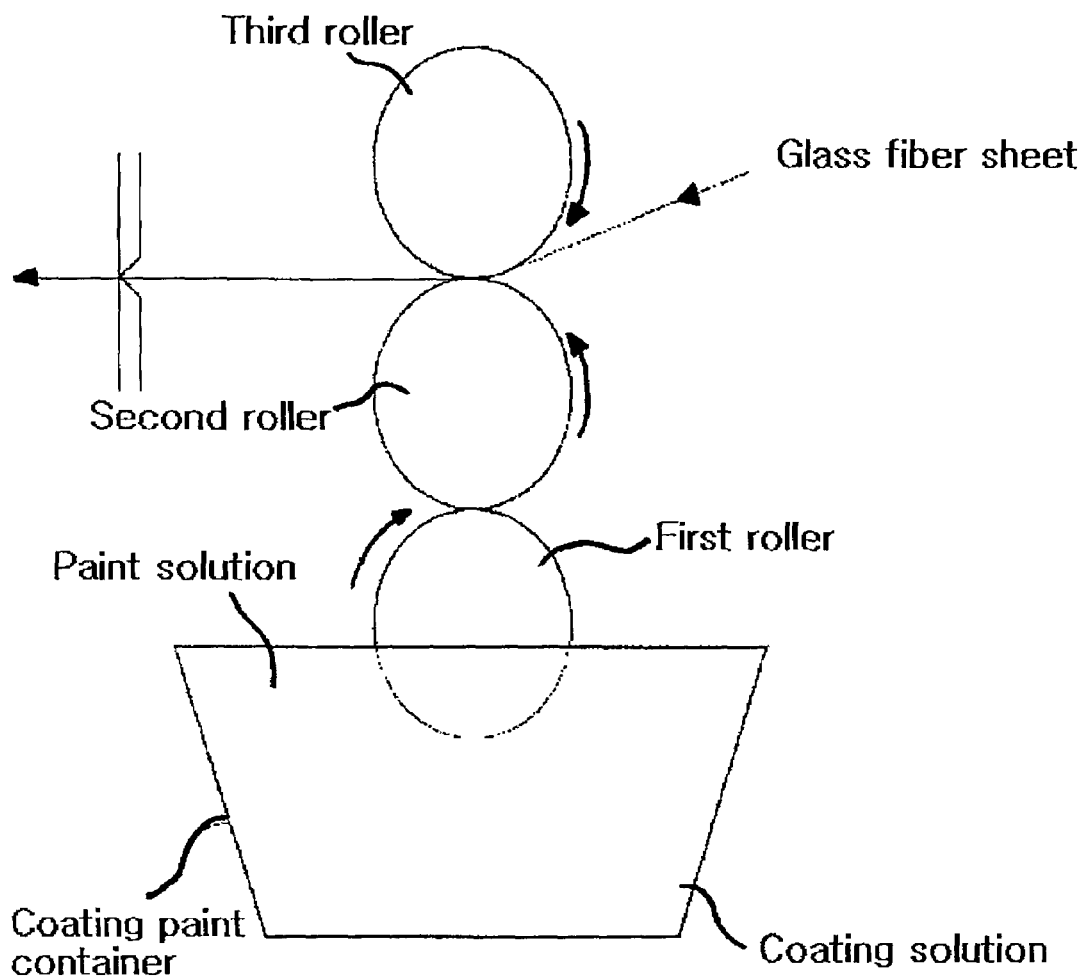
FIGS. 4 and 5 is a schematic view showing an impregnation and coating process according to an embodiment of the present invention.
Figure 5:
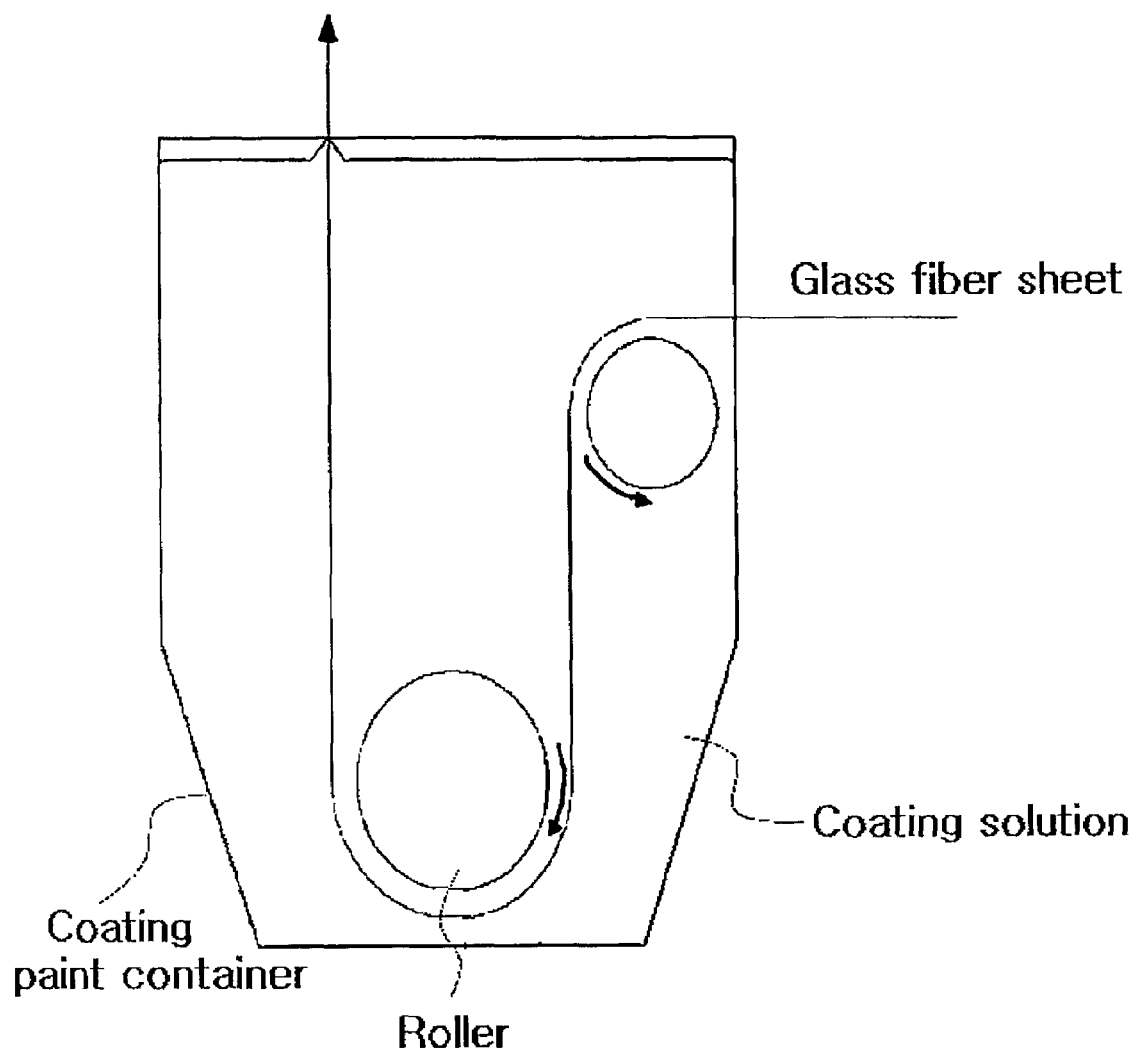

FIGS. 4 and 5 are each a schematic view of an apparatus for forming an SCR coating layer by impregnating a glass fiber sheet as a glass fiber support in a coating composition.

FIG. 4 schematically shows an apparatus using a roller coating method in which a glass fiber sheet is first coated with a coating solution in a container, while the coating solution is delivered from a first stage to a second stage, and is finally surface-controlled with a spatula.

FIG. 5 schematically shows an apparatus using a coating method simpler than that of FIG. 4 in which a glass fiber sheet is directly impregnated with a paint in the container and then is coated with the paint while surface control and coating film thickness control are achieved.

Figure 6:
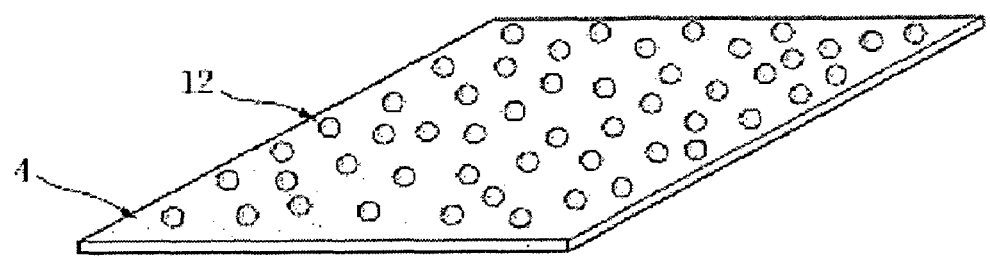
FIG. 6 is a perspective view of a porous plate-type glass fiber sheet according to an embodiment of the present invention.

FIG. 6 is a perspective view schematically showing a glass fiber sheet as a planar plate-type glass fiber support, as observed in FIG. 2. As shown in the drawing, it is understood that the sheet is porous.

Figure 7:
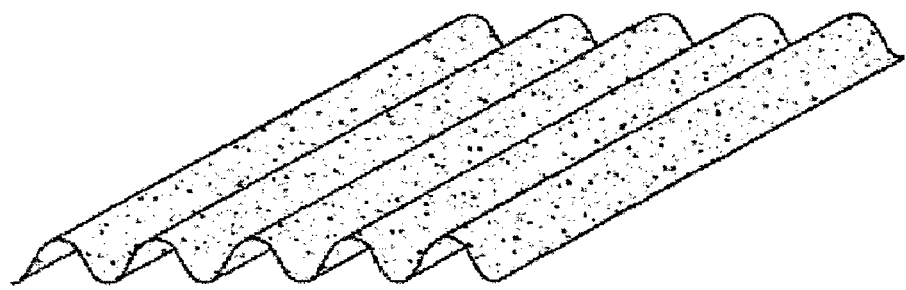
FIGS. 7 to 10 are perspective views of the SCR catalytic module elements classified according to an embodiment of the present invention.

FIGS. 7 to 10 are perspective views of the catalytic module elements for selective catalytic reduction classified according to an embodiment of the present invention, as observed in FIG. 3;

Referring to FIG. 7, one component of the catalytic module element for selective catalytic reduction according to an embodiment of the present invention is a sheet having a cross-sectional surface bent in a plurality of sinusoidal waveforms.

Figure 8:
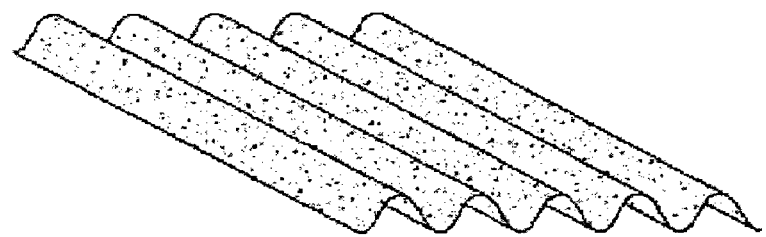

Referring to FIG. 8, one component of the catalytic module element for selective catalytic reduction according to an embodiment of the present invention is a sheet having a cross-sectional surface bent in a plurality of sinusoidal waveforms and chopping waveforms, each of which consists of halves.

Figure 9:
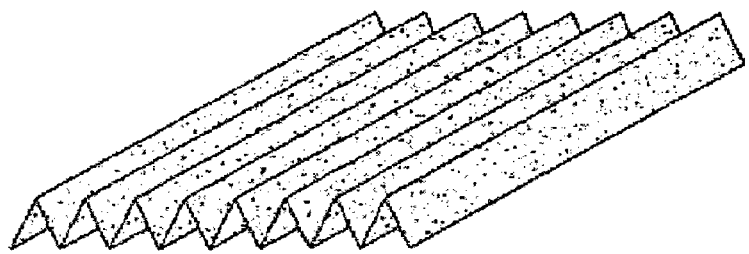

Referring to FIG. 9, one component of the catalytic module element for selective catalytic reduction according to an embodiment of the present invention is a sheet having a cross-sectional surface bent in a plurality of chopping waves.

Figure 10:
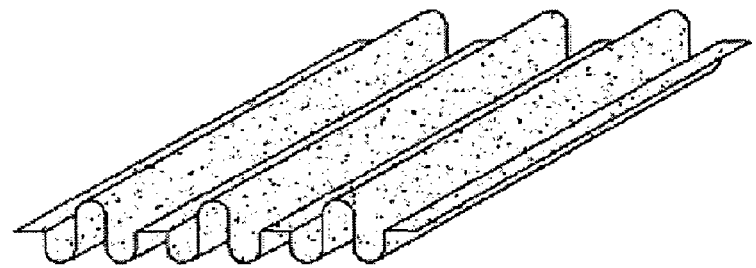

Referring to FIG. 10, one component of the catalytic module element for selective catalytic reduction according to an embodiment of the present invention is a sheet having a cross-sectional surface alternately having truncated ridges and bent in a plurality of substantially sinusoidal waveforms.

Figure 11:
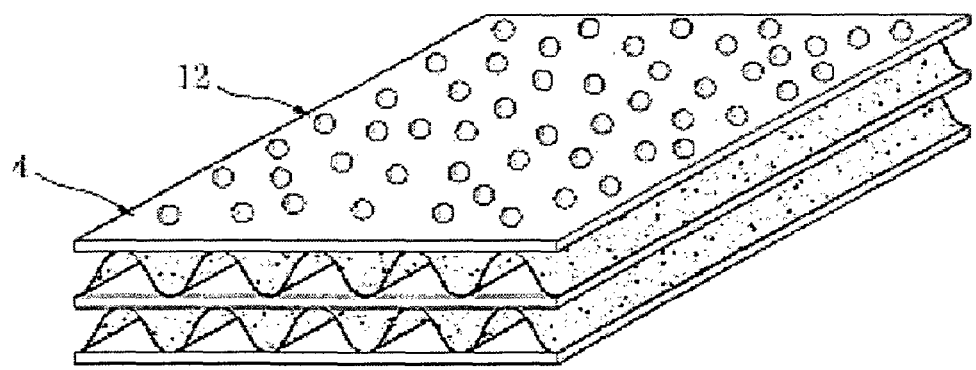
FIGS. 11 to 14 are partial perspective views of shapes laminated in suitable combinations of the SCR catalytic module elements according to an embodiment of the present invention.

FIGS. 11 to 14 show structures laminated in suitable combinations of the catalytic module elements for selective catalytic reduction according to an embodiment of the present invention;

FIG. 11 shows a structure example of the catalytic module element for selective catalytic reduction in which the porous plate-type sheet and a sinusoidal sheet having a cross-sectional surface with waveforms are laminated with each other.

Figure 12:
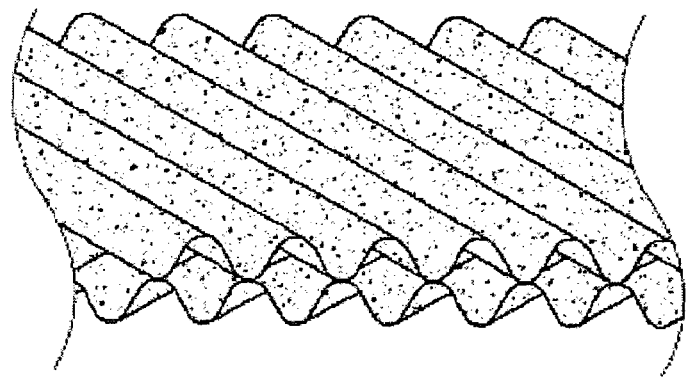

FIG. 12 shows another structure example of the catalytic module element for selective catalytic reduction in which sinusoidal sheets having a cross-sectional surface with waveforms are intersected and laminated with each other.

Figure 13:
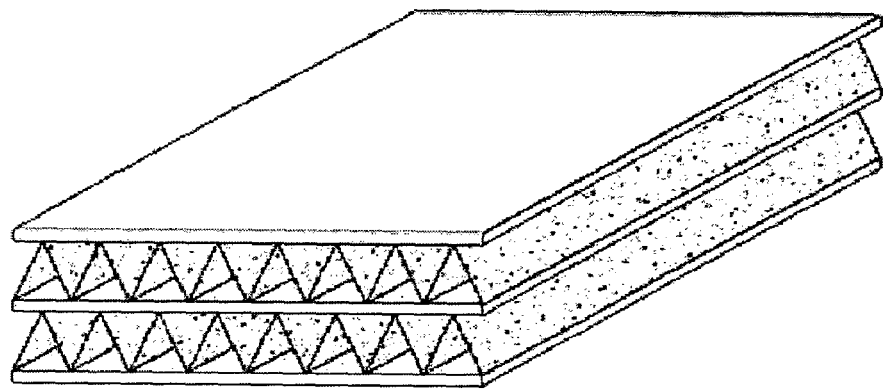

FIG. 13 shows still another structure example of the catalytic module element for selective catalytic reduction in which the porous plate-type sheet and a sheet having a cross-sectional surface with chopping waveforms are sequentially and repeatedly laminated.

Figure 14:
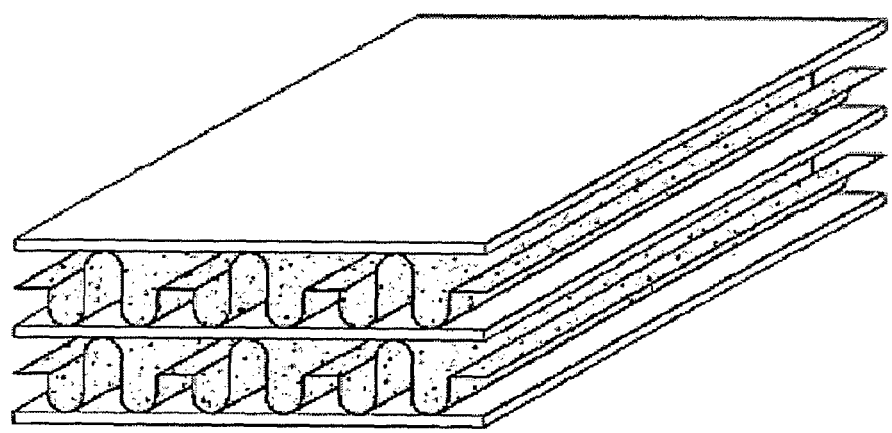

FIG. 14 shows still another structure example of the catalytic module element for selective catalytic reduction in which the porous plate-type sheet and a sheet having a cross-sectional surface alternately having truncated ridges and substantially sinusoidal waveforms are sequentially and repeatedly laminated.

Figure 15:
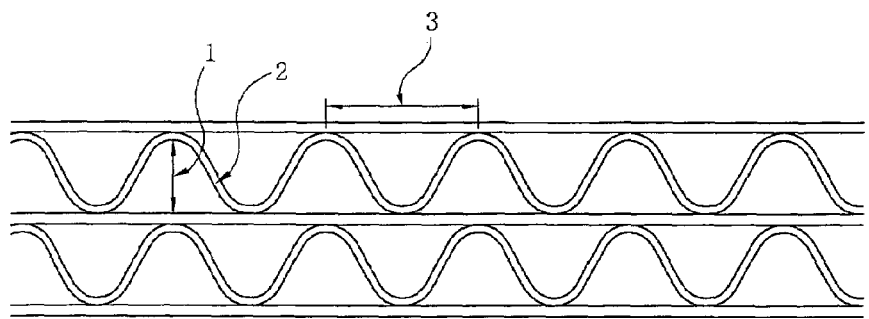
FIG. 15 is a vertical cross-sectional view of the SCR catalytic module element in which a plurality of sheets are laminated, according to an embodiment of the present invention.
Figure 16:
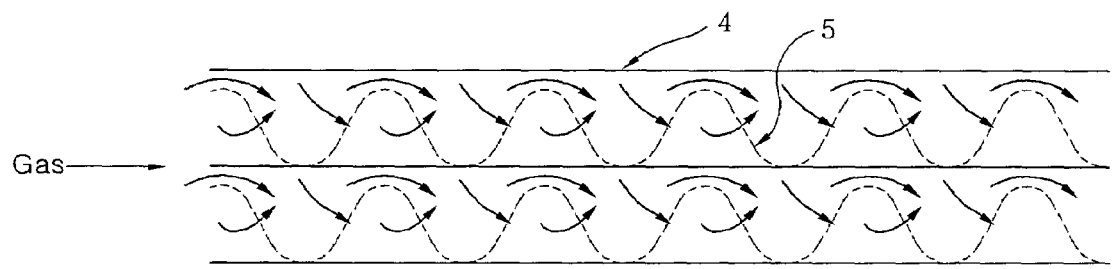
FIGS. 16 to 18 are each a schematic view showing the moving path of the exhaust gas flowing the inside of the SCR catalytic module elements laminated according to an embodiment of the present invention.
Figure 17:
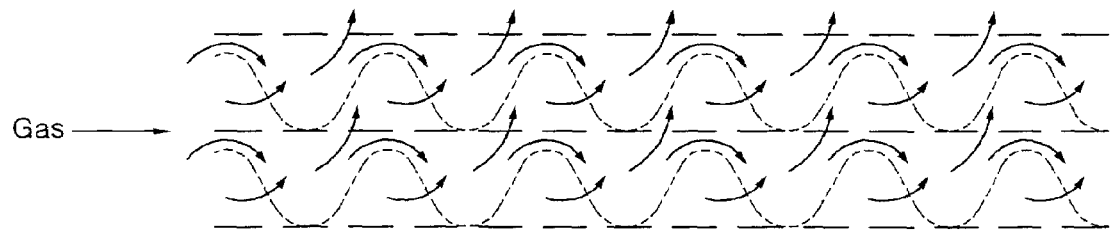
Figure 18:
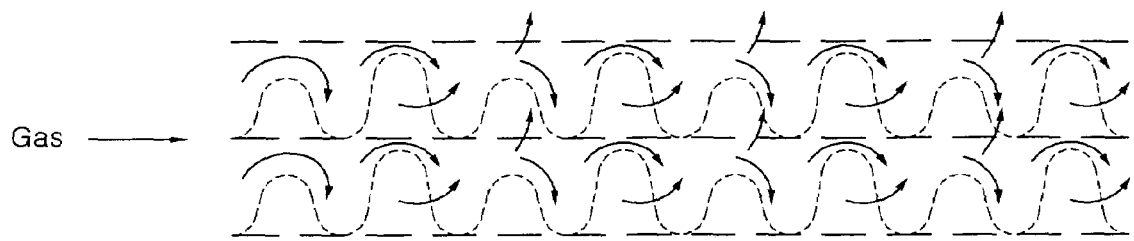
Figure 19:
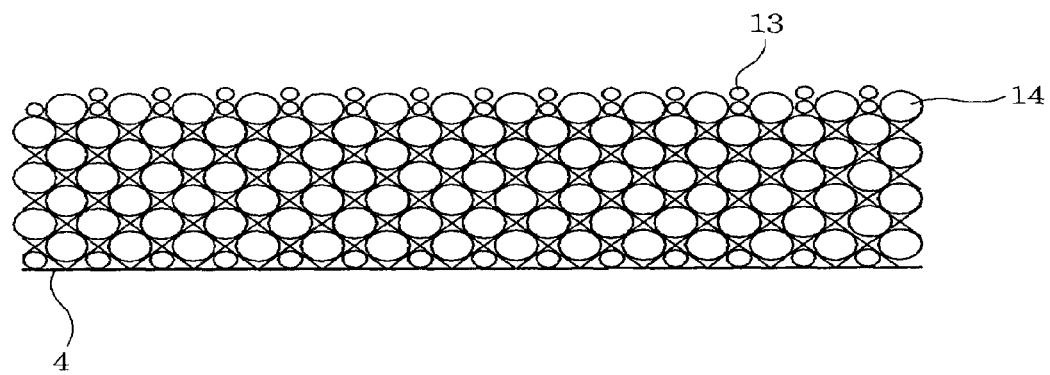
FIGS. 19 and 20 are each a schematic view showing a mechanism for discharging outside nitrogen and water vapor which are formed by the reaction of nitrogen oxides and ammonia and/or oxygen in the inside of the SCR catalytic module elements laminated according to an embodiment of the present invention.
Figure 20:
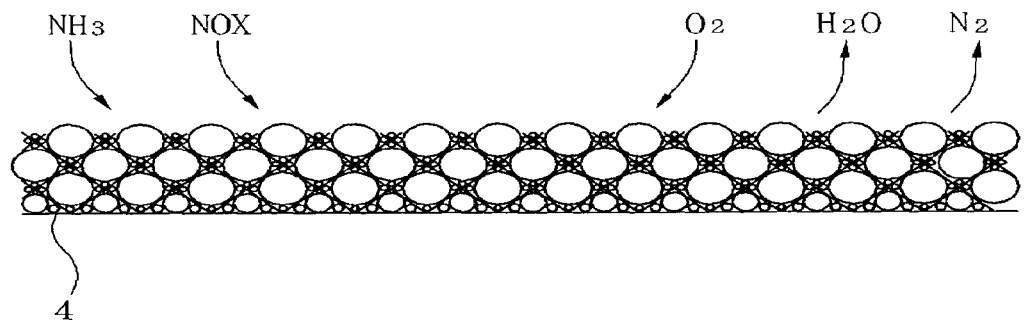

FIG. 15 is a vertical cross-sectional view of a catalytic module element for selective catalytic reduction in which a plurality of sheets are laminated, as described above and FIGS. 16 to 18 schematically show the moving path of the exhaust gas adsorbed to the catalytic module elements laminated according to an embodiment of the present invention;

FIGS. 19 and 20 schematically show a mechanism for discharging outside nitrogen and water vapor which are formed by the reaction of nitrogen oxides as the exhaust gas and ammonia and/or oxygen in the inside of the catalytic module in which the SCR coating layer is formed.

Figure 21:
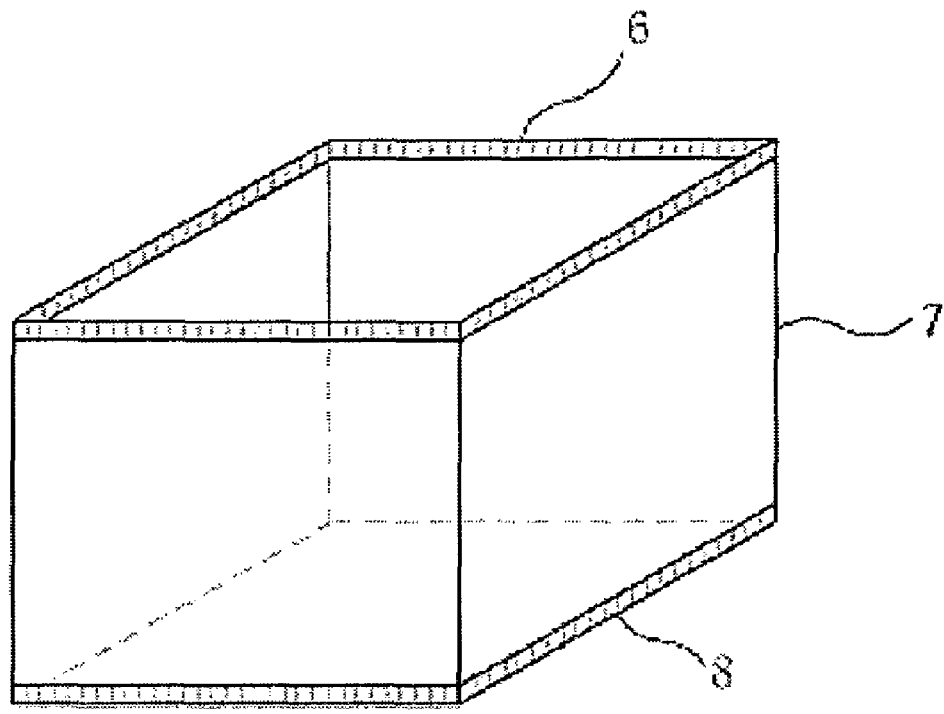
FIG. 21 is a projective perspective view of a hollow cubic case provided with opened upper and lower sides for receiving a plurality of SCR catalytic module elements according to an embodiment of the present invention.
Figure 22:
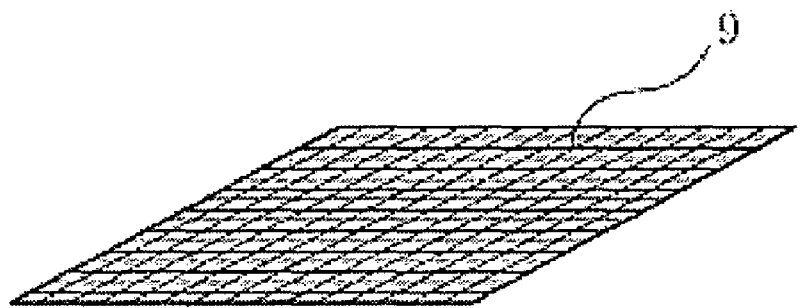
FIG. 22 is a perspective view of a cap for sealing the upper and lower sides of the case.
Figure 23:
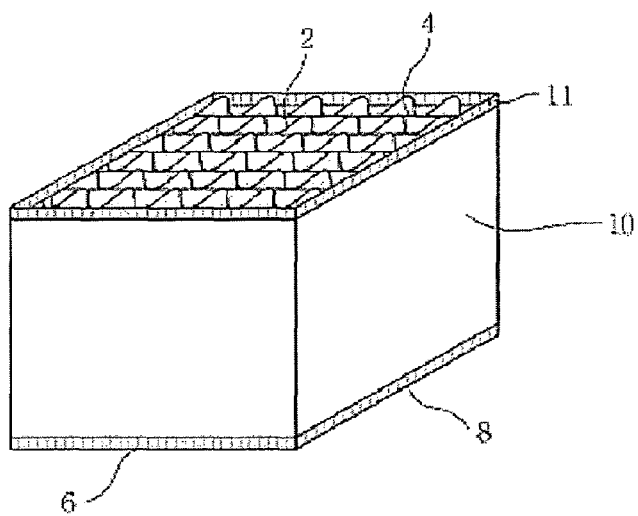
FIG. 23 is a partial perspective view of a cassette for receiving a plurality of SCR catalytic module elements according to an embodiment of the present invention and a perspective view showing a shape in which the SCR catalytic module elements are accumulated in a catalytic module.
Figure 24:
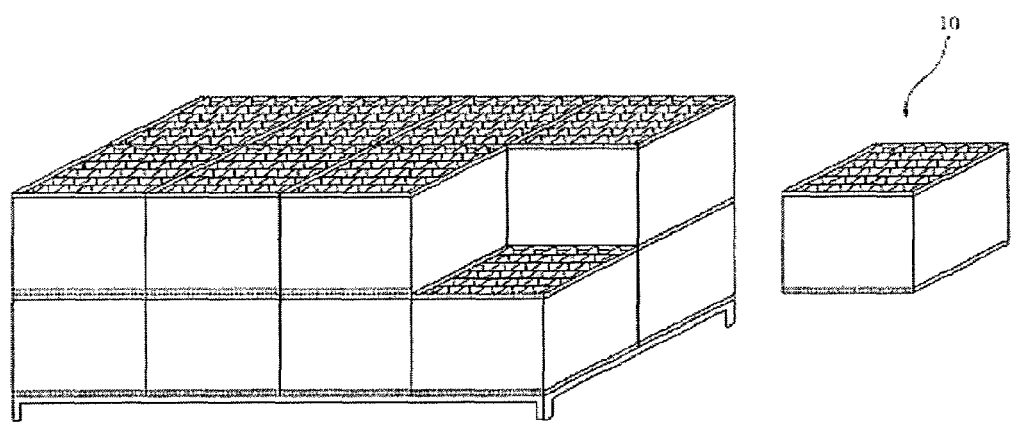
FIG. 24 is a perspective view of a shape in which a plurality of SCR catalytic module cassettes are suitably accumulated.

FIG. 21 shows a hollow cubic case module provided with opened upper and lower sides for receiving the plurality of SCR catalytic module elements and FIG. 22 shows a cap for sealing the upper and lower sides of the case. The size thereof can be designed according to the amount of nitrogen oxides ($NO_x$) discharged from the feedstock fuel and the desulfurization equipment FIGS. 23 to 24 are each a perspective view of a module fabricated by accumulating a plurality of catalytic module cassettes in a suitable form.

MODE FOR INVENTION

Hereinafter, the present invention will be described in more detail by way of the following Examples. However, the following Examples are given by way of illustration to facilitate a better understanding of the present invention and are not intended to limit the present invention.

Preparative Example 1

Fabrication of Plate-Type or Waveform Glass Fiber Sheet

Glass fiber sheets having a thickness of 0.5 mm, a length of 150 mm and a width of 500 mm were fabricated in a plate-type and various waveforms (crimped, waved, notched and undulated) corresponding to FIGS. 6 to 10 by pressuring with a hot roller (manufactured by Gapjin Company) or mold (manufactured by Gapjin Company) in accordance with types of the feedstock fuel, the amount of gas discharged and the amount of dust contained in the discharged gas. In this case, the height between the ridge and the valley was 1 mm and the pitch spacing between the valley and the valley was 6 mm.

Preparative Example 2

Preparation of Silicone-Based Polymer and Storage Stability Test

The silicone-based polymers were prepared by mixing the compositions of alkoxysilane, water-dispersible silica (Ludox™, manufactured by Du Pont Company), an organic solvent and a pH-modified curing catalyst, which are used during the preparation of the silicone-based polymer, as shown in the following table 1 to determine the properties of storage stability thereof and the results were shown in Table 1.

TABLE 1

| Composition (g) | | Preparative Example | | | | | | | | |
|---|---|---|---|---|---|---|---|---|---|---|
| | | 2-1 | 2-2 | 2-3 | 2-4 | 2-5 | 2-6 | 2-7 | 2-8 | 2-9 |
| methyltrimethoxysilane | | 42 | | 42 | 42 | | | 35 | 35 | 35 |
| methyltriethoxysilane | | 30 | 37 | | | 42 | 42 | 37 | | |
| dimethyldiethoxysilane | | | 30 | | 30 | | 30 | | | 37 |
| diphenyldimethoxysilane | | 30 | 37 | 30 | | 30 | | | 37 | |
| water-dispersible silica | | 60 | 60 | 60 | 60 | 60 | 60 | 60 | 60 | 60 |
| solvent | methanol | 40 | 40 | 40 | 40 | 40 | 40 | 40 | 40 | 40 |
| | ethanol | 40 | 40 | 40 | 40 | 40 | 40 | 40 | 40 | 40 |
| | propanol | 15 | 15 | 15 | 15 | 15 | 15 | 15 | 15 | 15 |
| | isopropanol | 23 | 23 | 23 | 23 | 23 | 23 | 23 | 23 | 23 |
| | ethylene glycol | 10 | 10 | 20 | 20 | 20 | | | | |
| | propylene glycol | 10 | 10 | | | | | 20 | 20 | 20 | 20 |
| pH-modified curing catalyst | hydrochloric acid | | | 1.4 | | | | | | 1.4 |
| | sulfuric acid | | | | 1.4 | | | | 1.4 | |
| | nitric acid | | | | | | 1.4 | | 1.4 | | |
| | dicyandiamide | | | | | | 1.4 | | | |
| properties | storage stability (curing time) | 20 days | 15 days | 20 days | 7 days | 2 days | 15 days | 10 days | 5 days | 14 days |

Example 1

Preparation of SCR Catalytic Module and Evaluation for Decomposition Efficiency of $NO_x$ The blending proportions of the silicone-based polymer of Preparative Example 2, glass fiber powders (Glassue™, manufactured by KCC Corporation), and an SCR catalyst (manufactured by Nano Chemical Inc.) were changed as shown in Table 2. A plate-type glass fiber sheet was impregnated in the coating solution according to Preparative Example 1 and coated using a coating apparatus shown in FIG. 4 or 5, air dried and then pressurized by positioning in any molds having various shapes to fabricate chopping waveform, sinusoidal waveform and substantially sinusoidal waveform sheets. Then, the sheets were calcined at 200° C. for 30 minutes to fabricate the desired SCR catalytic module elements. The elements were suitably combined to prepare SCR catalytic module cassettes having a multilayered structure and then cased to assemble a catalyst module. Nitrogen oxides ($NO_x$) were passed through the SCR catalytic module and the decomposition efficiency thereof was determined. The results were shown in the following Table 2.

TABLE 2

| composition (g) | Example | | | | | |
| --- | --- | --- | --- | --- | --- | --- |
| | 1-1 | 1-2 | 1-3 | 1-4 | 1-5 | 1-6 |
| silicone-based ceramic powders | 25 | 25 | 25 | 25 | 25 | 25 |
| SCR catalyst | 258 | 248 | 238 | 228 | 218 | 208 |
| silicone-based polymer (Preparative Example 2-1) | 45 | 55 | 65 | 75 | 85 | 95 |
| ethylene glycol | 58 | 58 | 58 | 58 | 58 | 58 |
| propylene glycol | 58 | 58 | 58 | 58 | 58 | 58 |
| $NO_x$   300° C. | 85 | 81 | 72 | 67 | 51 | 47 |
| 250° C. | 72 | 66 | 51 | 43 | 38 | 34 |
| 200° C. | 65 | 52 | 42 | 36 | 28 | 21 |

As can be seen in Table 2 above, when the amount of the SCR catalyst was increased and the content of the silicone-based polymer was decreased, the decomposition efficiency of $NO_x$ was increased, but was not increased when the content of the silicone-based polymer was a certain amount (45 g) or more.

The invention claimed is:

1. A catalytic coating composition for selective catalytic reduction for the removal of nitrogen oxides, containing a silicone-based polymer in a range of 10 to 70 parts by weight of the total composition, silicone-based ceramic powders or glass fiber powders in a range of 1 to 20 parts by weight of the total composition, and catalyst powders for selective catalytic reduction (SCR) in a range of 30 to 80 parts by weight of the total composition.

2. The catalytic coating composition for selective catalytic reduction according to claim 1, wherein the silicone-based polymer is dissolved in an organic solvent.

3. The catalytic coating composition for selective catalytic reduction according to claim 2, wherein the organic solvent is one or more selected from the group consisting of methanol, ethanol, propanol, isopropanol, ethylene glycol and propylene glycol, and contained in the range of 10 to 50 parts by weight based on the total composition.

4. The catalytic coating composition for selective catalytic reduction according to claim 1, wherein the silicone-based polymer is a hydrolytic condensation product of alkoxysilane represented by the following formula (I) and water-dispersible silica;

$$(R^1)_n Si(OR^2)_m \qquad (1)$$

wherein $R^1$ and $R^2$ may be the same or different from each other and are independently selected from an alkyl group having 1 to 6 carbon atoms and an aryl group having 6 to 20 carbon atoms;

n is an integer of 1 or 2; and m is an integer of 2 or 3.

5. The catalytic coating composition for selective catalytic reduction according to claim 4, wherein the alkoxysilane is one or more selected from the group consisting of methyltrimethoxysilane, methyltriethoxysilane, dimethyldiethoxysilane and diphenyldimethoxysilane.

6. The catalytic coating composition for selective catalytic reduction according to claim 4, wherein the water-dispersible silica has pH of 3 to 11, a particle size of 15 to 40 μm and a solid content of 20 to 80% by weight based the total composition.

7. The catalytic coating composition for selective catalytic reduction according to claim 6, wherein a pH-modified curing catalyst is used to acidify the water-dispersible silica when the water-dispersible silica is neutral or alkaline.

8. The catalytic coating composition for selective catalytic reduction according to claim 7, wherein the pH-modified curing catalyst is hydrochloric acid, sulfuric acid, nitric acid or dicyandiamide.

* * * * *